US010090495B2

(12) United States Patent
Hasegawa et al.

(10) Patent No.: US 10,090,495 B2
(45) Date of Patent: Oct. 2, 2018

(54) ELECTRICITY STORAGE DEVICE

(71) Applicant: Nissan Motor Co., Ltd., Yokohama-shi, Kanagawa (JP)

(72) Inventors: Takashi Hasegawa, Ibaraki (JP); Shinichi Ishikuro, Ibaraki (JP); Nayuta Yamachi, Ibaraki (JP); Fumihiro Kojima, Ibaraki (JP); Kouji Kato, Kanagawa (JP); Toyoki Iguchi, Kanagawa (JP); Shigeyuki Kiyota, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 95 days.

(21) Appl. No.: 15/506,808

(22) PCT Filed: Aug. 26, 2015

(86) PCT No.: PCT/JP2015/074038
§ 371 (c)(1),
(2) Date: Feb. 27, 2017

(87) PCT Pub. No.: WO2016/031863
PCT Pub. Date: Mar. 3, 2016

(65) Prior Publication Data
US 2017/0271634 A1 Sep. 21, 2017

(30) Foreign Application Priority Data

Aug. 29, 2014 (JP) .................................. 2014-175588

(51) Int. Cl.
*H01M 2/10* (2006.01)
*H02G 15/08* (2006.01)
(Continued)

(52) U.S. Cl.
CPC .......... *H01M 2/1077* (2013.01); *H01G 11/10* (2013.01); *H01G 11/78* (2013.01);
(Continued)

(58) Field of Classification Search
CPC .... H01M 2/1077; H01M 2/1094; H01M 2/10; H01G 11/10; H01G 11/78; H05K 5/0017; H02G 15/08
See application file for complete search history.

(56) References Cited

U.S. PATENT DOCUMENTS

2012/0244397 A1* 9/2012 Tenhouten .......... H01M 2/1005
429/61
2013/0078487 A1* 3/2013 Shin .................... H01M 10/482
429/62
(Continued)

FOREIGN PATENT DOCUMENTS

JP 2001006643 A 1/2001
JP 2005197192 A 7/2005
(Continued)

*Primary Examiner* — Stewart A Fraser
(74) *Attorney, Agent, or Firm* — Young Basile Hanlon & MacFarlane, P.C.

(57) ABSTRACT

An electricity storage device including: plural electricity storage modules, each including an electricity storage module case, plural electricity storage cells housed in the electricity storage module case, and external terminals; an electricity storage case in which the plurality of electricity storage modules are arranged and housed; plural wire harnesses connected to the external terminals of the electricity storage modules; and a vibration damping material provided in a space region between one surface of the electricity storage case and, among the plurality of wire harnesses, at least a wire harness including the longest length extending in an arrangement direction of the electricity storage modules, wherein the wire harness including the longest length extending in the arrangement direction of the electricity (Continued)

storage modules is biased toward a side of the electricity storage module case by the one surface of the electricity storage case, through the vibration damping material.

14 Claims, 12 Drawing Sheets

(51) Int. Cl.
- *H01G 11/10* (2013.01)
- *H01G 11/78* (2013.01)
- *H05K 5/00* (2006.01)

(52) U.S. Cl.
CPC ........... *H01M 2/10* (2013.01); *H01M 2/1094* (2013.01); *H02G 15/08* (2013.01); *H05K 5/0017* (2013.01)

(56) References Cited

U.S. PATENT DOCUMENTS

2013/0273398 A1* 10/2013 Hoshi ................. H01M 2/1077
 429/61
2014/0030563 A1 1/2014 Hoshi et al.

FOREIGN PATENT DOCUMENTS

| | | | |
|---|---|---|---|
| JP | 2007157358 | A | 6/2007 |
| JP | 2013235827 | A | 11/2013 |
| JP | 2013251124 | A | 12/2013 |
| JP | 2014203770 | A | 10/2014 |
| JP | 2015191763 | A | 11/2015 |
| WO | 2012140727 | A1 | 10/2012 |

* cited by examiner

ELECTRICITY STORAGE DEVICE

CROSS REFERENCE TO RELATED APPLICATION

The entire content of Japanese Patent Application No. 2014-175588 (filed on Aug. 29, 2014) in which the priority right of the present patent application is claimed is herein incorporated by reference.

TECHNICAL FIELD

The present invention relates to an electricity storage device in which a plurality of electricity storage modules are housed.

BACKGROUND

An electricity storage device, as a power source, is mounted on electric vehicles, hybrid vehicles, and the like. In a case of the electricity storage device, a plurality of electricity storage modules, each including a plurality of secondary battery cells, such as lithium-ion secondary battery cells, are arranged and housed.

The electricity storage modules are electrically connected via wire harnesses connected to external terminals. A large current flows in the wire harnesses when charging/discharging the electricity storage device, and thus, the wire harnesses are members having large thicknesses and small resistances.

Conventionally, a power-supply device in which a plurality of holder cases, each housing a predetermined plurality number of electricity storage modules, are housed in an outer case is known. The power-supply device has a structure in which concave parts are provided on the respective holder cases and a power-supply line formed of a metal plate is fit into the concave parts. By the structure, even when the power-supply device is shaken by vibration or the like during running of a vehicle, breakage of connecting terminals due to vibration of the power-supply line is prevented (for example, refer to JP 2001-6643 A).

SUMMARY

In recent years, a sense of discomfort provided by vibrating sound generated when the wire harnesses vibrate to come into contact with a case member of the electricity storage device when charging/discharging the electricity storage device has become a problem. The above-described patent literature does not take measures against the problem. In addition, a vibration prevention structure of the wire harnesses connected to the respective electricity storage modules in the holder cases is not provided.

According to one aspect of the present invention, there is provided an electricity storage device including: a plurality of electricity storage modules, each including an electricity storage module case, a plurality of electricity storage cells housed in the electricity storage module case, and external terminals of positive and negative electrodes; an electricity storage case in which the plurality of electricity storage modules are arranged and housed; a plurality of wire harnesses connected to the external terminals of the positive and negative electrodes of the electricity storage modules; and a vibration damping material provided in a space region between one surface of the electricity storage case and, among the plurality of wire harnesses, at least a wire harness including the longest length extending in an arrangement direction of the electricity storage modules, wherein the wire harness including the longest length extending in the arrangement direction of the electricity storage modules is biased toward a side of the electricity storage module case by the one surface of the electricity storage case, through the vibration damping material.

According to the present invention, vibrating sound generated when the wire harnesses vibrate to come into contact with a case member of the electricity storage device when charging/discharging the electricity storage device can be suppressed.

DETAILED DESCRIPTION OF THE EMBODIMENTS

Hereinafter, an embodiment of an electricity storage device of the present invention will be described with reference to the drawings.

The electricity storage device according to the present embodiment is applied to an in-vehicle power-supply device in a motor drive system of a motor-driven vehicle, for example, an electric vehicle. The concept of the electric vehicle includes a hybrid electric vehicle including an engine that is an internal-combustion engine, and a motor, as a driving source of the vehicle, and a pure electric vehicle using a motor as a sole driving source of the vehicle, and the like.

[Overall Structure of Electricity Storage Device]

Figure 1:
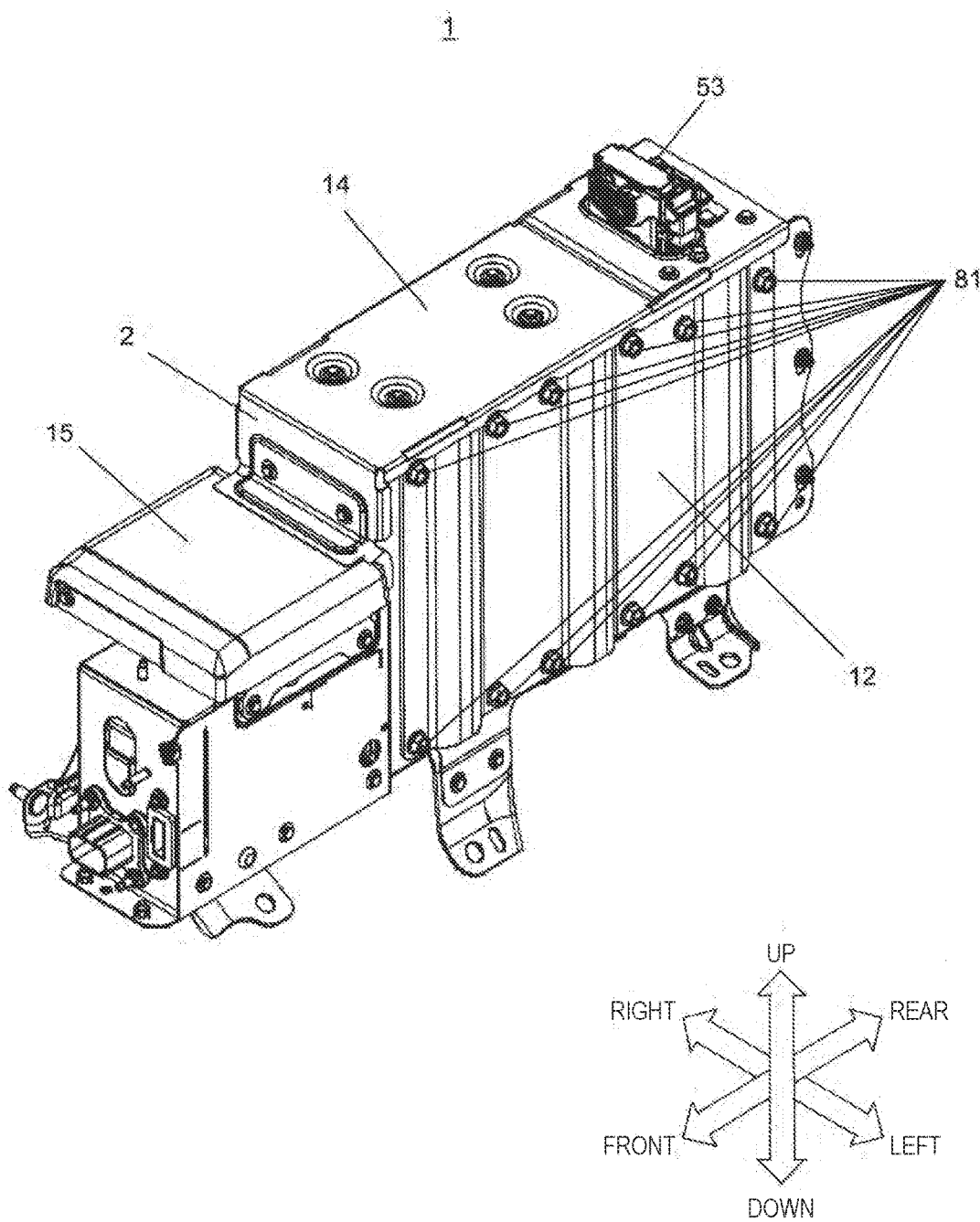
FIG. 1 is an external perspective view of an embodiment of an electricity storage device according to the present invention.
Figure 2:
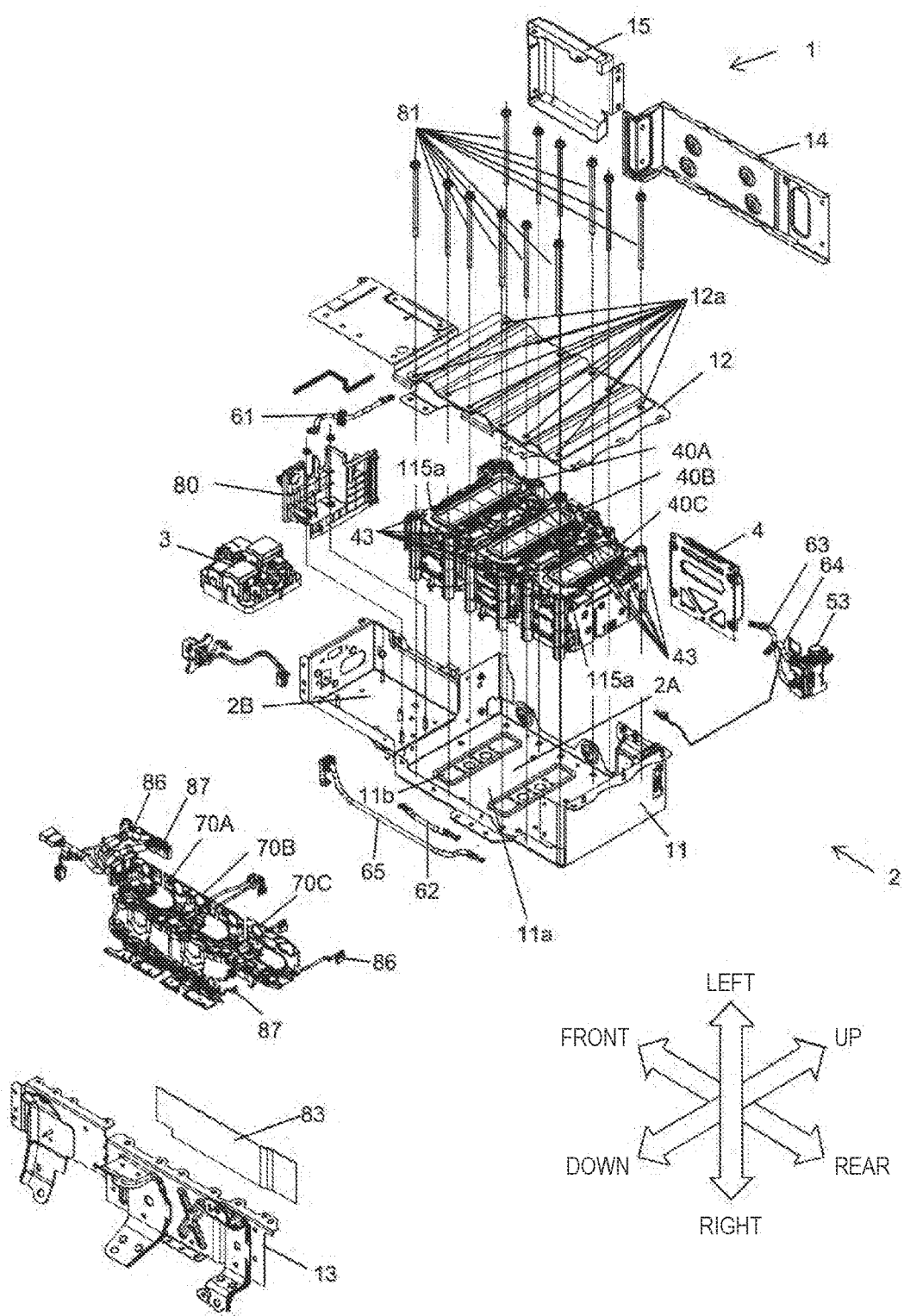
FIG. 2 is an exploded perspective view of the electricity storage device illustrated in FIG. 1.

FIG. 1 is an external perspective view of the embodiment of the electricity storage device according to the present invention, and FIG. 2 is an exploded perspective view of the electricity storage device illustrated in FIG. 1. An electricity storage device 1 is, for example, a lithium-ion battery device, and a plurality of electricity storage modules 40A to 40C, each including a plurality of secondary battery cells (electricity storage cells) 101, such as lithium-ion secondary battery cells, (refer to FIGS. 5A and 5B) is housed in an electricity storage case 2 that is a housing of the electricity storage device 1. The electricity storage case 2 has a shape in which a small rectangular parallelepiped is connected to the front side of a large rectangular parallelepiped. In the following description, a front-rear direction, a left-right direction, and an up-down direction will be described as directions illustrated in FIG. 1 and FIG. 2. Each direction illustrated in FIG. 1 and FIG. 2 corresponds to the front-rear direction, the left-right direction, and the up-down direction in a vehicle on which the electricity storage device 1 is mounted, respectively.

The electricity storage case 2 includes a main case 11, a side cover 12, a bottom cover 13, and a top cover 14. The main case 11 is a member having a frame shape in which the upper part, the lower part, and the left part open. Each of the main case 11, the side cover 12, the bottom cover 13, and the top cover 14 is formed by pressing a metal thin plate, for example.

The side cover 12 is a member arranged to be opposed to a right wall 11a of the main case 11, constitutes a left wall, and closes the opening of the left part of the main case 11. Through holes 12a into which bolts 81 to be described below, which are through bolts, are to be inserted are provided in the side cover 12. The bottom cover 13 is a member that closes the opening of the lower part of the main case 11, and the top cover 14 is a member that closes the opening of the upper part of the main case 11. Each of the side cover 12, the bottom cover 13, and the top cover 14 is fixed to the main case 11 with fastening members, such as bolts, to form a space for housing electronic components therein.

In the electricity storage case 2, an electricity storage module-housing area 2A in which the electricity storage modules 40A to 40C are to be housed, and a control unit-housing area 2B in which a junction box 3 is to be housed are formed. The junction box 3 is a control circuit that measures a charge/discharge current, outputs a signal, and has a precharge function to suppress an inrush current into a capacitor of an inverter when activating a vehicle.

In the electricity storage module-housing area 2A, a plurality of (three in the present embodiment) electricity storage modules 40A to 40C are arranged. Each of the electricity storage modules 40A to 40C has a block shape of a rectangular parallelepiped. In the present embodiment, each of the electricity storage modules 40A to 40C is housed to be arranged adjacent to and in parallel with one another in the front-rear direction with the longitudinal directions thereof extending in the up-down direction in the main case 11. Each of the electricity storage modules 40A to 40C is arranged linearly at predetermined intervals in order of the electricity storage modules 40A, 40B, and 40C in a direction away from the control unit-housing area 2B, i.e., to the rear direction. Hereinafter, the electricity storage modules 40A to 40C will be collectively described as an electricity storage module 40, appropriately. As will be described below, the electricity storage module 40 is fixed to the main case 11 with the bolts 81 together with the side cover 12. Back nuts 82 to be fastened to the bolts 81 (refer to FIG. 10B) are welded to be fixed to the right-side surface of the right wall 11a of the main case 11.

A lithium-ion battery controller (hereinafter, LBC) 4 is disposed above the control unit-housing area 2B. The LBC 4 is a control circuit for measuring, monitoring, and controlling a voltage, a current, a temperature, charge/discharge, and the like for the electricity storage module 40 and each cell, and is covered with a LBC cover 15.

The electricity storage module-housing area 2A and the control unit-housing area 2B of the electricity storage case 2 are partitioned by a partitioning member 80. In addition, as illustrated in FIG. 1, a SD (service disconnect) switch 53 is inserted into an opening of the top cover 14 to project outward from the top cover 14 of the electricity storage case 2.

[Structure of Electricity Storage Module]

Figure 3:
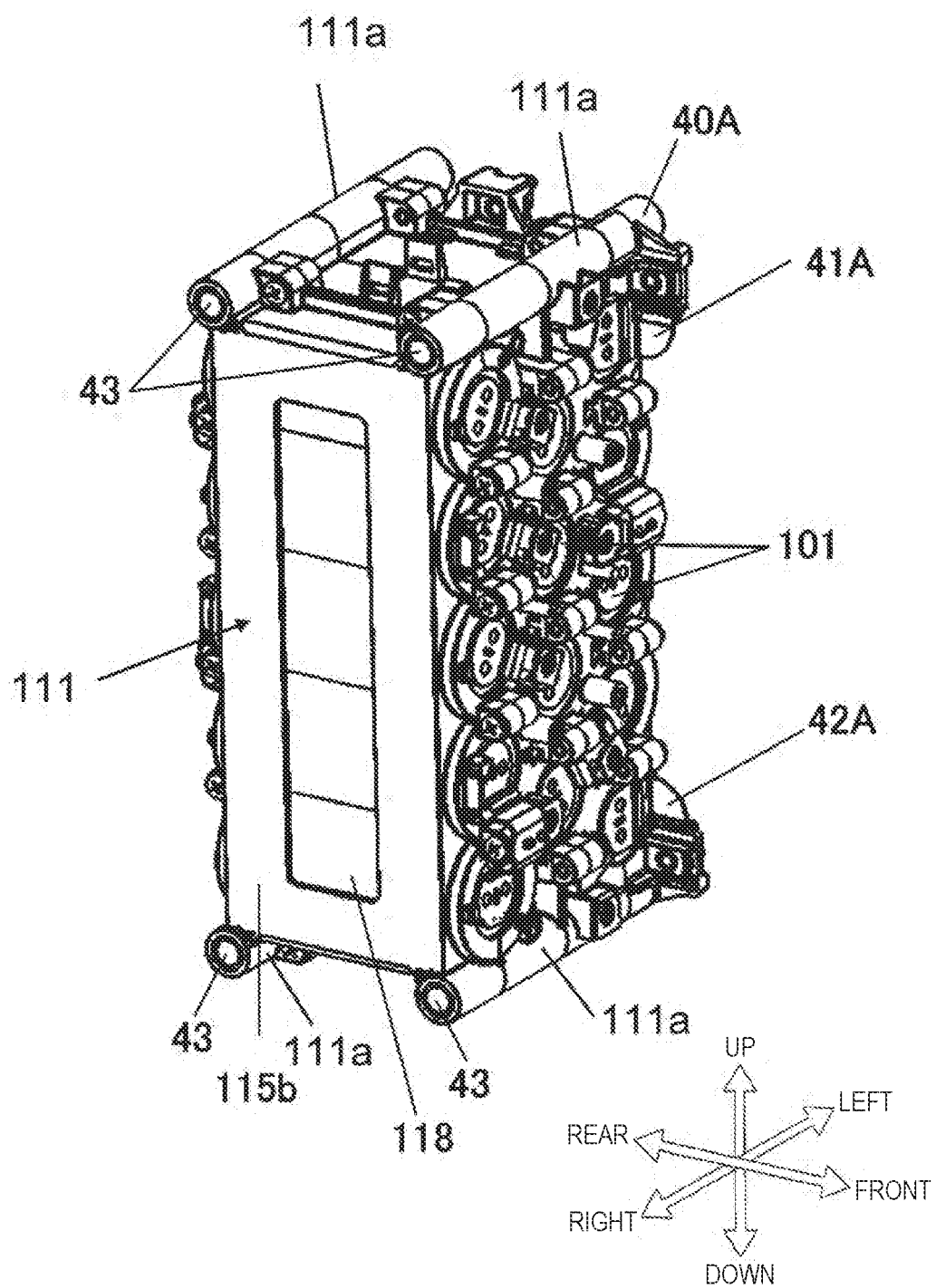
FIG. 3 is a perspective view of an electricity storage module illustrated in FIG. 2.
Figure 4:
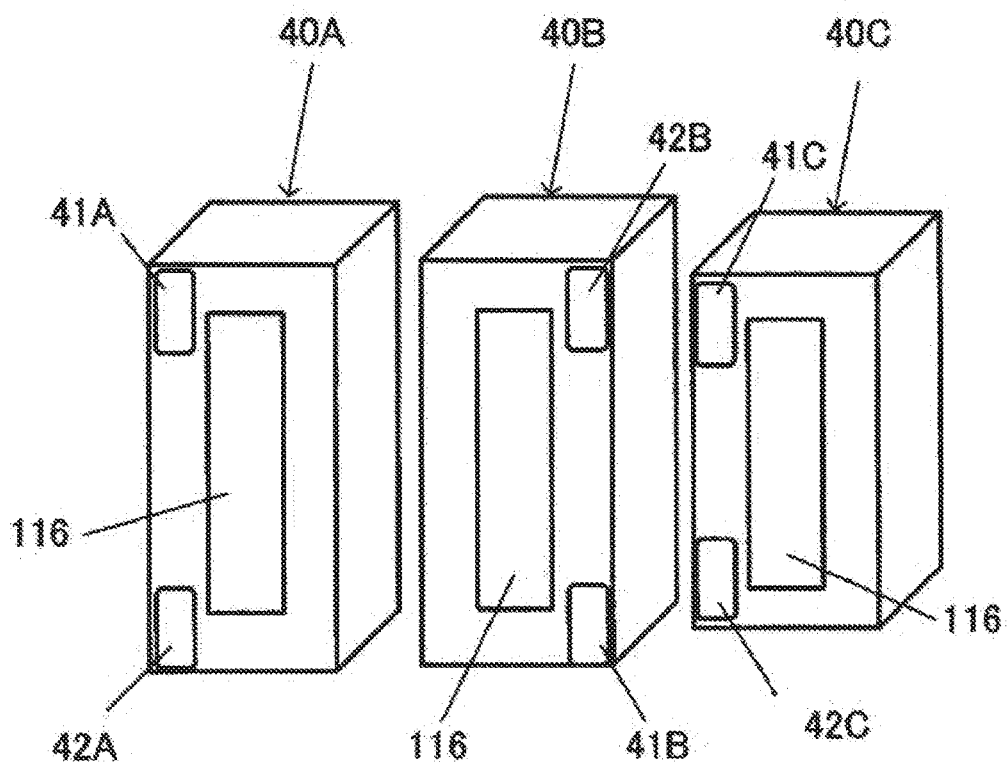
FIG. 4 is a schematic external perspective view of the electricity storage module illustrated in FIG. 3.
Figure 5A:
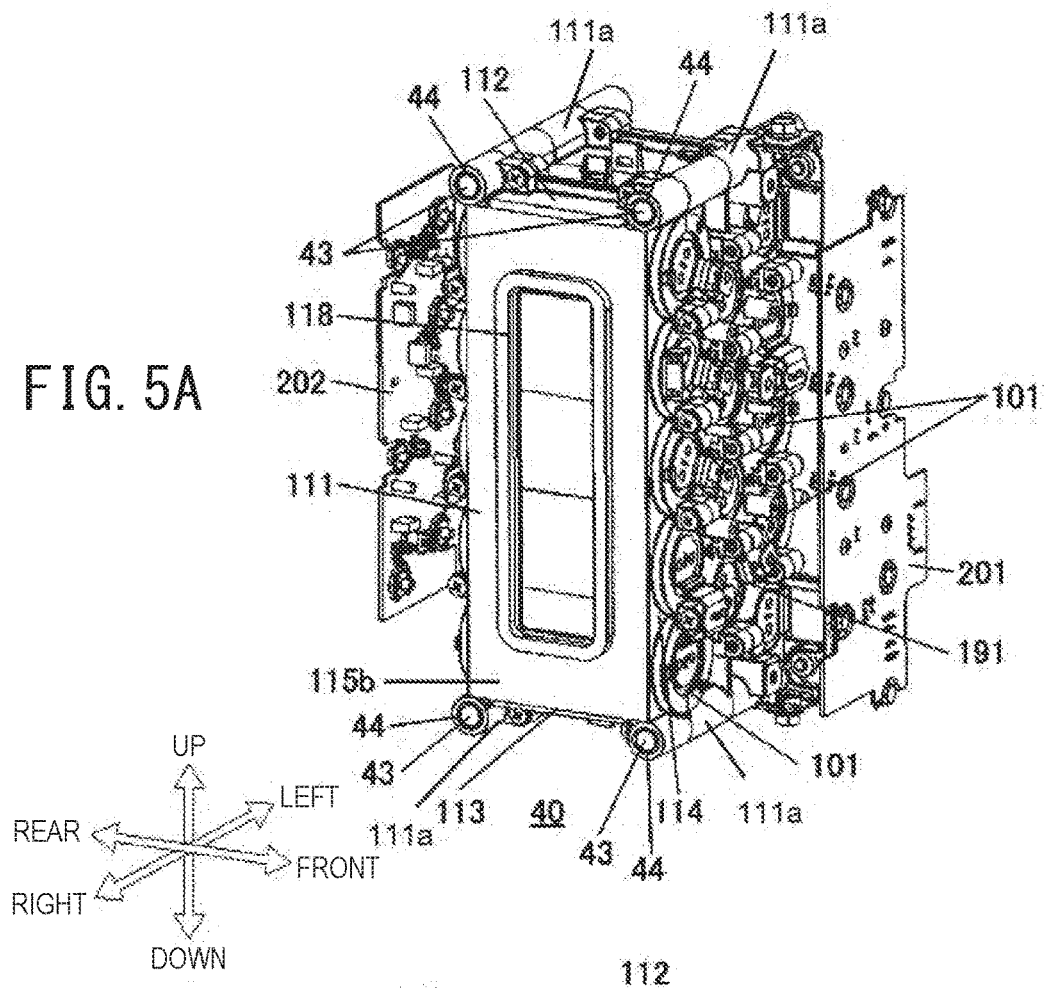
FIG. 5A is an exploded perspective view for describing the structure of the electricity storage module illustrated in FIG. 3.
Figure 5B:
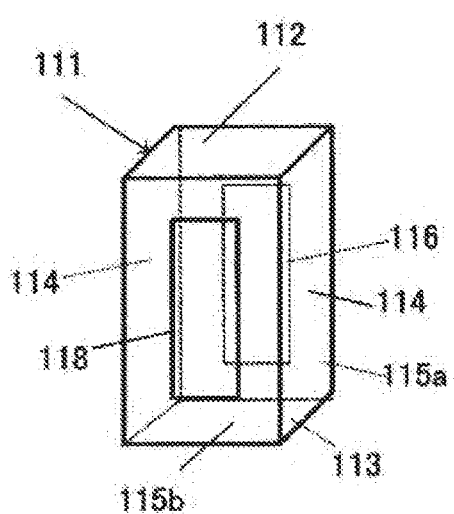
FIG. 5B is a schematic external perspective view of the electricity storage module.

FIG. 3 is a perspective view of the electricity storage module illustrated in FIG. 2, and FIG. 4 is a schematic external perspective view of the electricity storage module illustrated in FIG. 3. In addition, FIG. 5A is an exploded perspective view for describing the structure of the electricity storage module illustrated in FIG. 3, and FIG. 5B is a schematic external perspective view of the electricity storage module. A refrigerant inlet port 116 is provided on the left part of each of the electricity storage modules 40A to 40C. In addition, a refrigerant outlet port 118 is provided on the right part of each of the electricity storage modules 40A to 40C. In the respective electricity storage modules 40A to 40C, positive electrode terminals (external terminals) 41A to 41C and negative electrode terminals (external terminals) 42A to 42C are provided on separated parts on both ends in the longitudinal (up-down) direction, as illustrated in the schematic view of FIG. 4. Each of the electricity storage modules 40A to 40C has a rectangular parallelepiped-shaped holding case 111, and cylindrical tubular parts 111a (tubular protrusions) extending in the left-right direction are integrally formed on four corners of the holding case 111. In each of the tubular parts 111a, a module fixing through hole (insertion part) 43 that penetrates each of the tubular parts 111a in the axial direction is respectively provided. The above-described bolts 81 are inserted into the through holes 12a of the side cover 12 and the module fixing through holes 43 of the tubular parts 111a of the electricity storage module 40 to be screwed into the back nuts 82 welded on the rear surface of the main case 11.

[Electrical Connection of Electricity Storage Module]

Figure 6A:
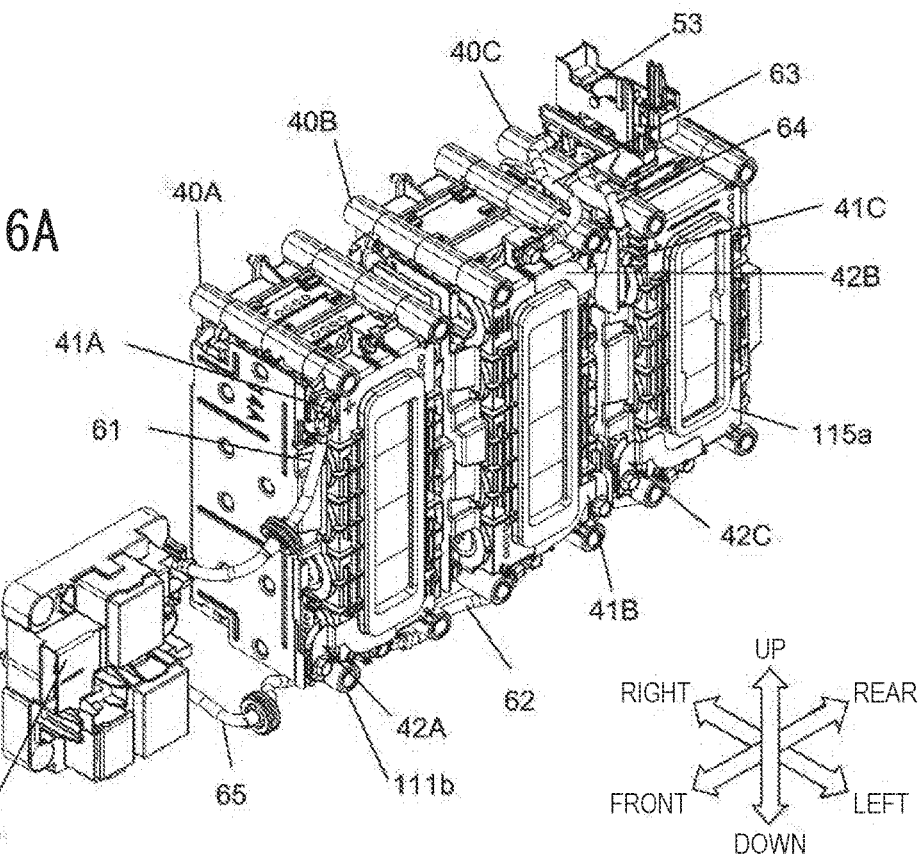
FIG. 6A is a perspective view for describing the electrical connection state of each of the electricity storage modules.
Figure 6B:
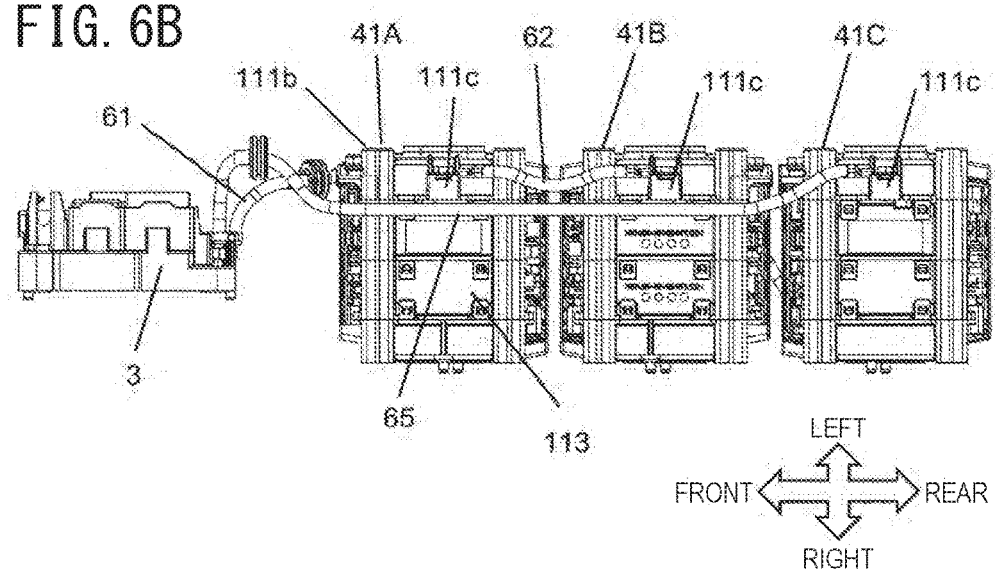
FIG. 6B is a bottom view of FIG. 6A.
Figure 7:
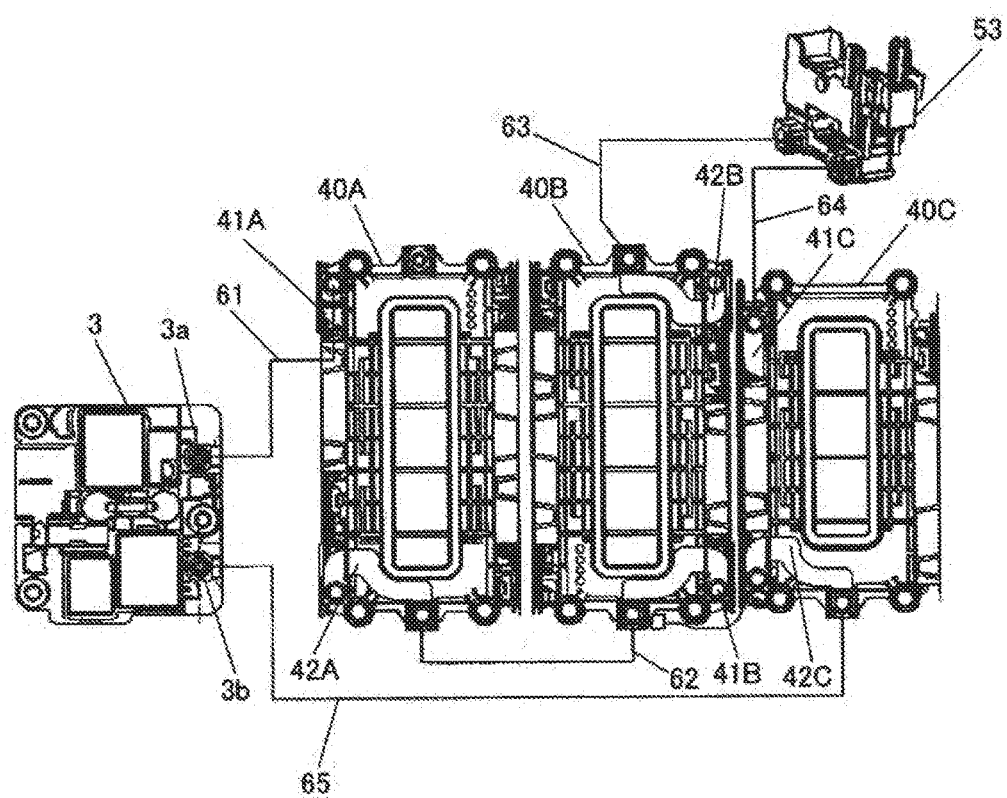
FIG. 7 is a schematic side view for describing the electrical connection state of each of the electricity storage modules.

FIG. 6A is a perspective view for describing the electrical connection state of each of the electricity storage modules, and FIG. 6B is a bottom view of FIG. 6A. In addition, FIG. 7 is a schematic side view for describing the connection state of high-voltage harnesses 61 to 65 to each of the electricity storage modules 40A to 40C.

The high-voltage harnesses (wire harnesses) 61 to 65 are connected to the six external terminals, the positive electrode terminal 41A of the electricity storage module 40A to the negative electrode terminal 42C of the electricity storage module 40C, and thus, the electricity storage modules 40A to 40C are connected in series. More specifically, a plus terminal 3a of the junction box 3 and the positive electrode terminal 41A of the electricity storage module 40A are connected with the high-voltage harness 61, and the negative electrode terminal 42A of the electricity storage module 40A and the positive electrode terminal 41B of the electricity storage module 40B are connected with the high-voltage harness 62.

The negative electrode terminal 42B of the electricity storage module 40B and the positive electrode terminal 41C of the electricity storage module 40C are connected through the high-voltage harness 63, the SD switch 53, and the high-voltage harness 64. The negative electrode terminal 42C of the electricity storage module 40C and a minus terminal 3b of the junction box 3 are connected with the high-voltage harness 65.

The SD switch 53 is a safety device provided to ensure safety during maintenance and inspection of the electricity storage device 1, includes an electric circuit in which a switch and a fuse are electrically connected in series, and is operated by service personnel at the time of maintenance and inspection. In the present embodiment, as described above, the SD switch 53 is provided between the negative electrode terminal 42B of the electricity storage module 40B and the positive electrode terminal 41C of the electricity storage module 40C, and electrically connects or disconnects between the electricity storage module 40B and the electricity storage module 40C. The above-described connection between the high-voltage harnesses 61 to 65 and the electricity storage modules 40A to 40C is preferably jointing by soldering or the like, and the connection between the high-voltage harnesses 61 to 65 and the junction box 3 or the SD switch 53 is preferably a connection by a connector. However, both may be jointing by soldering or the like, or a connection by a connector.

The electricity storage module 40C is formed such that the number of the secondary battery cells 101 housed therein is smaller than those of the electricity storage modules 40A and 40B, and the height in the up-down direction is smaller than those of the electricity storage modules 40A and 40B. The electricity storage module 40B arranged at the center in the arrangement direction is reversely arranged with respect to the electricity storage modules 40A and 40C in the up-down direction. Thus, both the negative electrode terminal 42A of the electricity storage module 40A and the positive electrode terminal 41B of the electricity storage module 40B are arranged in the down direction, and can be connected with the high-voltage harness 62 having a short length.

Figure 8:
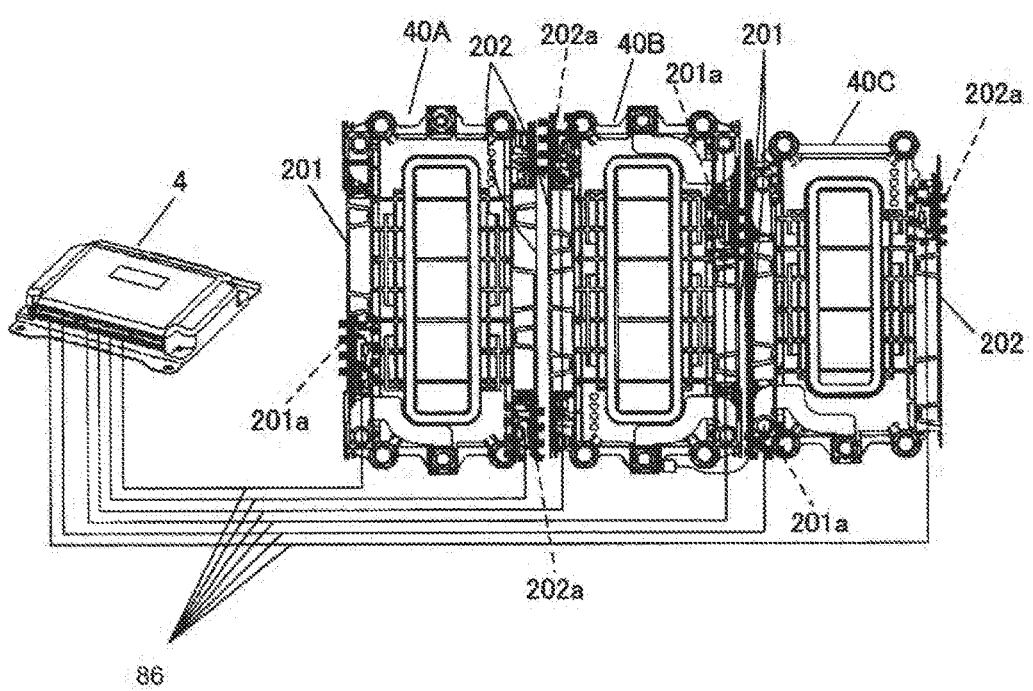
FIG. 8 is a schematic view for describing the connection state of voltage detection lines to each of the electricity storage modules.

FIG. 8 is a schematic view for describing the connection state of voltage detection lines 86 to each of the electricity storage modules 40A to 40C. Each of the electricity storage modules 40A to 40C has two voltage detection substrates 201 and 202 arranged along the side surfaces in the longitudinal (up-down) direction thereof. The voltage detection lines 86 connect the LBC 4 to connector connection parts 201a of the respective voltage detection substrates 201 and connector connection parts 202a of the respective voltage detection substrates 202.

In addition, the electricity storage modules 40A to 40C have temperature detection sensors for detecting temperatures of the electricity storage modules 40A to 40C, which are not illustrated. The LBC 4 and each of the temperature detection sensors are connected with a temperature sensor line 87.

The electricity storage modules 40A to 40C have the same structure. As illustrated in FIG. 5A, the electricity storage module 40 has a structure in which the plurality of secondary battery cells 101 is held in an electricity storage module case, i.e., the holding case 111, and, in the present embodiment, as will be described below, the secondary battery cells 101 are arranged in three steps in the left-right direction. As illustrated in FIG. 5B, the holding case 111 has a hexahedron shape. The holding case 111 has an upper surface part 112 and a lower surface part 113 which are spaced apart from and opposed to each other in the up-down direction, and a pair of vertical wall parts 114 which is spaced apart from and opposed to each other in the front-rear direction and extends over each of short side parts of the upper surface part 112 and the lower surface part 113. In addition, the holding case 111 is formed of resin, for example, and has a pair of a left-end surface part 115a and a right-end surface part 115b which is spaced apart from and opposed to each other in the left-right direction and extends over each of long side parts of the upper surface part 112, the lower surface part 113, and the pair of vertical wall parts 114.

The above-described refrigerant inlet port 116 is formed on the left-end surface part 115a of the holding case 111. The above-described refrigerant outlet port 118 is formed on the right-end surface part 115b of the holding case 111. FIG. 5B is a schematic view for illustrating the positional relationship between the refrigerant inlet port 116 and the refrigerant outlet port 118. A refrigerant, such as air, flows into the holding case 111 from the refrigerant inlet port 116, flows in the holding case 111 in the left-right direction, and flows out from the refrigerant outlet port 118 on the right side.

The electricity storage module 40 is arranged in a state of being housed in the electricity storage case 2 such that the left-end surface part 115a of the holding case 111 is opposed to the side cover 12 (also refer to FIG. 2), and the refrigerant inlet port 116 of the left-end surface part 115a is opposed to an intake port of the side cover 12, which is not illustrated. In addition, the right-end surface part 115b of the holding case 111 of the electricity storage module 40 is arranged to be opposed to the right wall 11a of the main case 11, and the refrigerant outlet port 118 of the right-end surface part 115b is opposed to an exhaust port 11b of the right wall 11a (refer to FIG. 2).

As described above, the high-voltage harness 61 connects the positive electrode terminal 41A on the upper side of the electricity storage module 40A to the junction box 3. The high-voltage harnesses 63 and 64 respectively connect the negative electrode terminal 42B on the upper side of the electricity storage module 40B and the positive electrode terminal 41C on the upper side of the electricity storage module 40C to the SD switch 53 arranged above the electricity storage module 40.

On the other hand, as illustrated in FIG. 6A, the high-voltage harnesses 62 and 65 are disposed on the lower-surface side of the electricity storage modules 40A to 40C. The high-voltage harness 62 extends in the arrangement direction (front-rear direction) of the electricity storage modules 40A to 40C, and connects the negative electrode terminal 42A of the electricity storage module 40A and the positive electrode terminal 41B of the electricity storage module 40B, which are next to each other. The high-voltage harness 65 connects the electricity storage module 40C arranged farthest from the junction box 3 in the front-rear direction, among the electricity storage modules 40A to 40C, and the junction box 3. Thus, the high-voltage harness 65 is placed below the electricity storage modules 40A to 40C from the negative electrode terminal 42C that is an external terminal on the negative-electrode side to the side surface of the electricity storage module 40A on the side of the junction box 3, and extends in the arrangement direction (front-rear direction) of the electricity storage modules 40A to 40C.

The high-voltage harnesses 62 and 65 are loosely disposed in order to facilitate easy connecting and due to variation in lengths. Thus, when charging/discharging the electricity storage device 1, the high-voltage harnesses 62 and 65 vibrate to come into contact with the bottom cover 13 of the electricity storage case 2, thereby generating vibrating sound.

Figure 11:
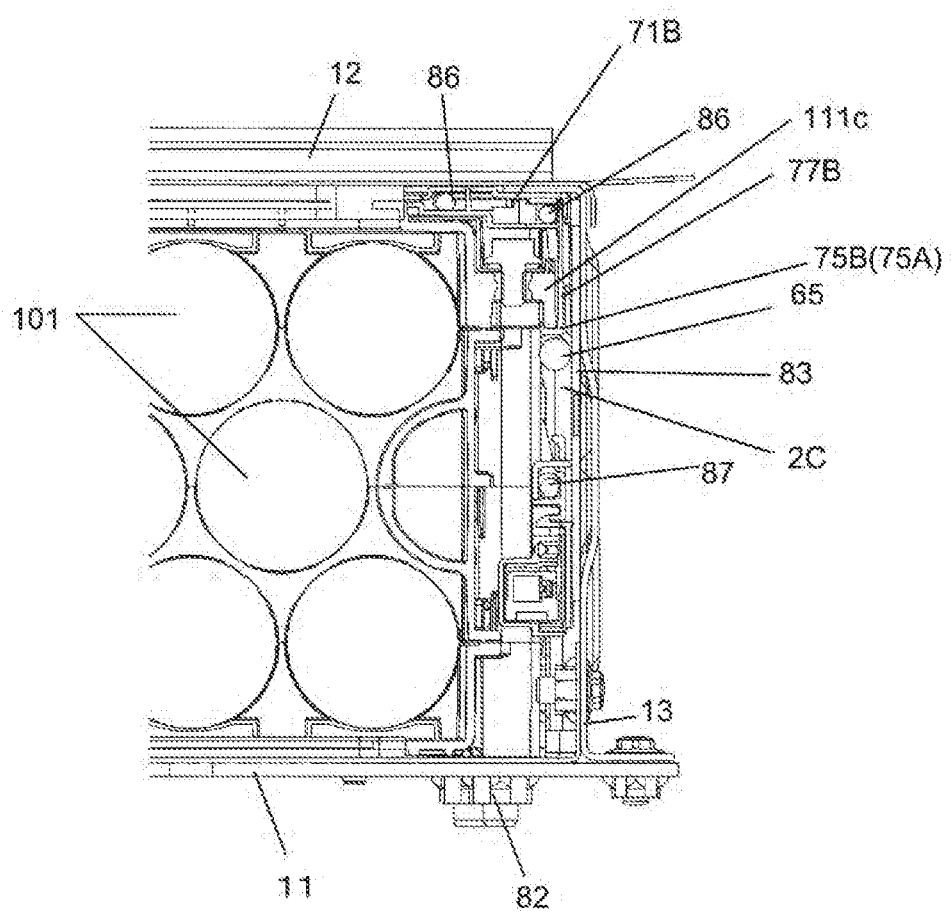
FIG. 11 is a cross-sectional view taken along the line XI-XI of FIG. 10B.
Figure 11:
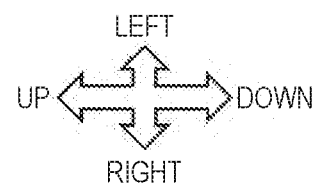
Figure 12:
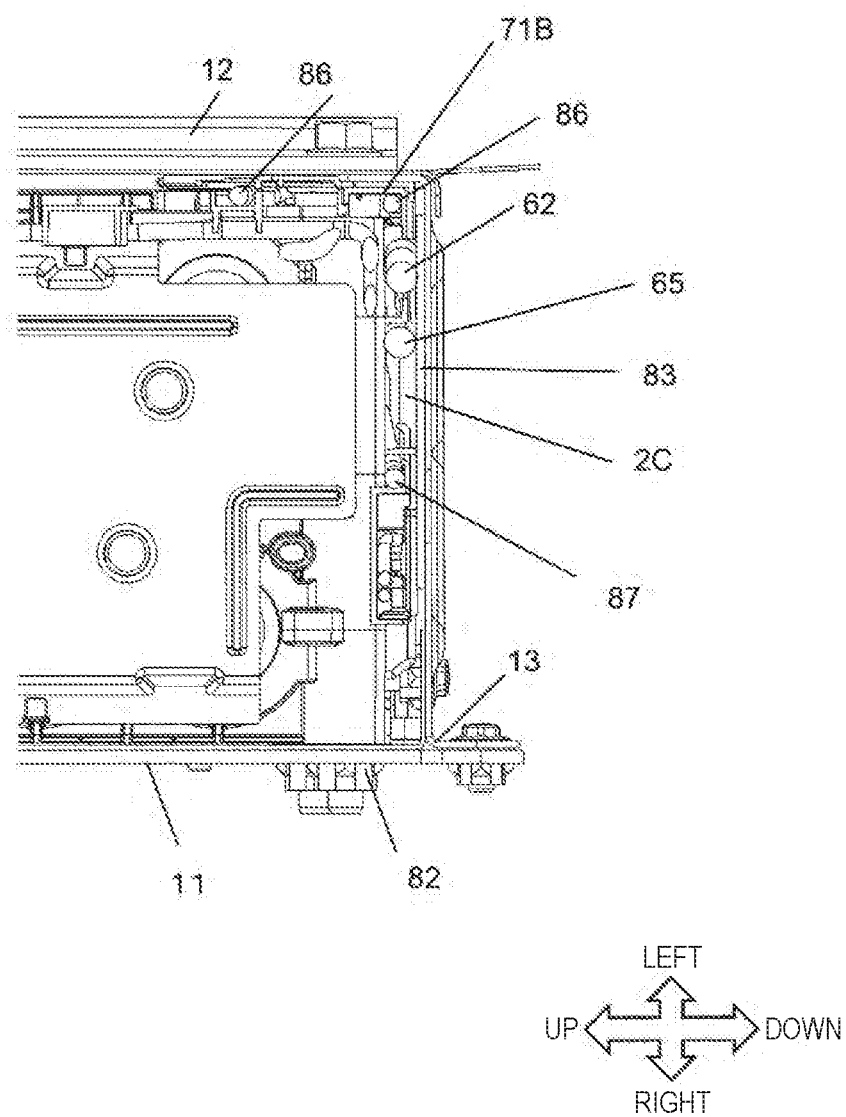
FIG. 12 is a cross-sectional view taken along the line XII-XII of FIG. 10B.

In FIG. 2, harness holders 70A to 70C and a vibration damping material 83 are disposed in a space region 2C between the bottom cover 13 and the electricity storage modules 40A to 40C (refer to FIGS. 11 and 12). The harness holders 70A to 70C and the vibration damping material 83 configure a harness vibrating sound prevention structure during charging/discharging, which suppresses the generation of the vibrating sound by the high-voltage harnesses 62 and 65.

[Harness Vibrating Sound Prevention Structure During Charging/Discharging]

Figure 9:
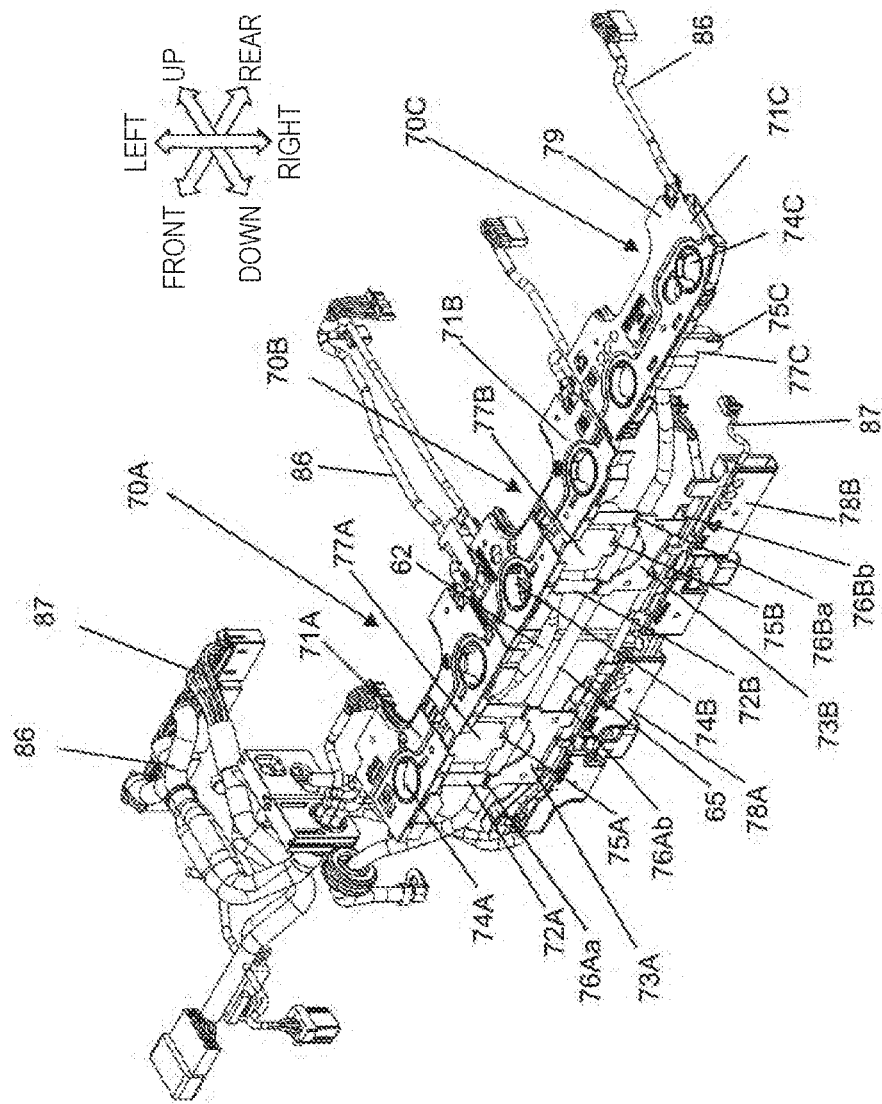
FIG. 9 is an enlarged perspective view illustrating the holding structure of harnesses by harness holders.
Figure 10A:
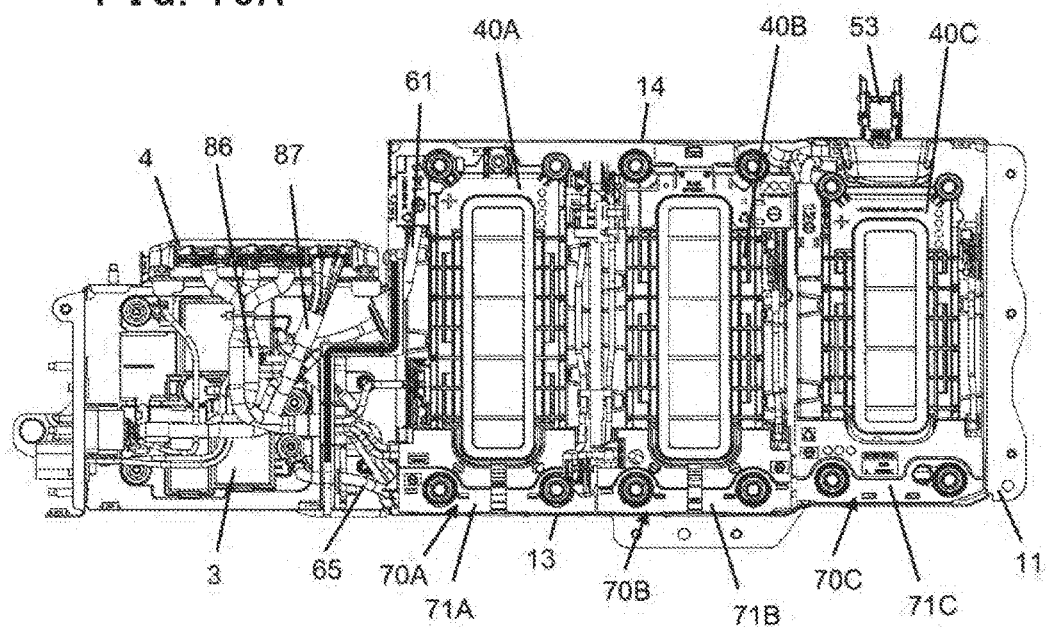
FIG. 10A is a side view illustrating the positional relationship between each of the electricity storage modules and a bottom cover and a top cover of an electricity storage case.
Figure 10B:
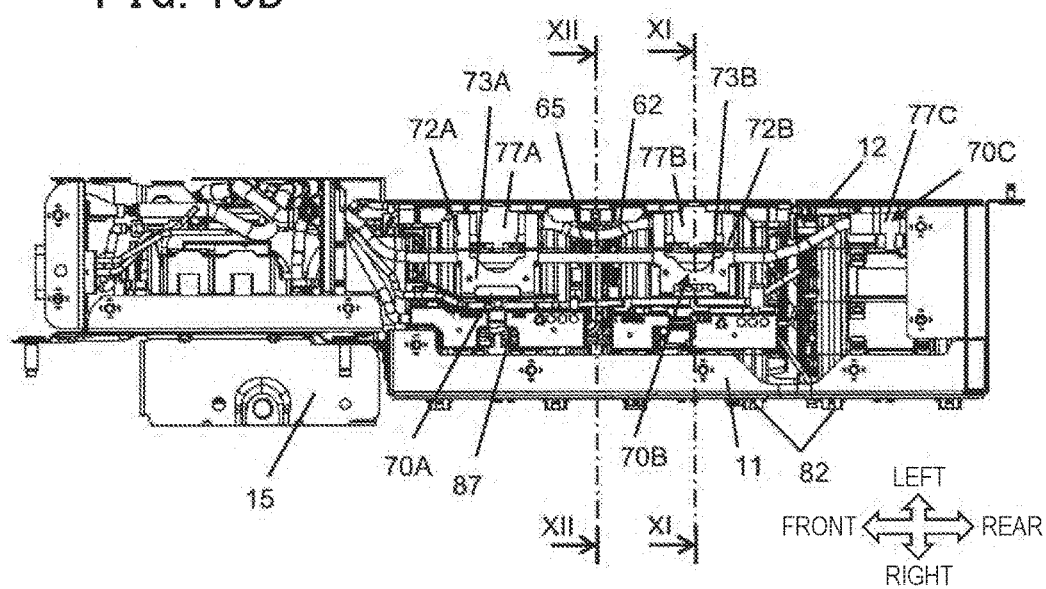
FIG. 10B is a bottom view of FIG. 10A.

FIG. 9 is an enlarged perspective view illustrating the holding structure of the harnesses by the harness holders. FIG. 10A is a side view illustrating the positional relationship between each of the electricity storage modules and the bottom cover and the top cover of the electricity storage case, and FIG. 10B is a bottom view of FIG. 10A. In addition, FIG. 11 is a cross-sectional view of the line XI-XI of FIG. 10B, and FIG. 12 is a cross-sectional view of the line XII-XII of FIG. 10B.

The vibration damping material 83 is formed of an elastic material, such as ethylene-propylene-diene rubber (EPDM), for example. The vibration damping material 83 has a substantially rectangular shape in which the length thereof (the length in the front-rear direction) is substantially the same as the entire length of the high-voltage harness 65 extending above the electricity storage modules 40A to 40C, and the width thereof (the length in the left-right direction) covers a region from the high-voltage harness 65 to the high-voltage harness 62. The vibration damping material 83 is bonded to the bottom cover 13, and biases the high-voltage harnesses 62 and 65 toward the side of the lower surface parts 113 of the holding cases 111 of the electricity storage modules 40A and 40B with the bottom cover 13 fixed to the main case 11. Thus, when charging/discharging the electricity storage device 1, the vibration of the high-voltage harnesses 62 and 65 is suppressed.

The harness holders 70A to 70C are formed of an insulating member, such as resin. The harness holders 70A and 70B have the same structure, and have fixing side parts 71A and 71B, fixing lower parts 77A and 77B, pairs of supporting parts 72A and 72B, connecting parts (pressing parts) 73A and 73B which connect the pairs of supporting parts 72A and 72B, and guiding parts 78A and 78B, respectively. A plurality of (two in the present embodiment) openings (first engaging parts) 74A and 74B are respectively provided in the fixing side parts 71A and 71B. Step parts 76Aa and 76Ba are respectively formed at the boundaries between the connecting parts 73A and 73B and the pairs of supporting parts 72A and 72B, and the connecting parts 73A and 73B are arranged at a position lower than the supporting parts 72A and 72B and the guiding parts 78A and 78B by steps of the step parts 76Aa and 76Ba, respectively. Restricting walls 76Ab and 76Bb are formed at the boundaries between the connecting parts 73A and 73B and the guiding parts 78A and 78B, respectively. Protruding pieces (second engaging parts) 75A and 75B which protrude to the up direction (refer to FIGS. 9 and 11) are provided on the fixing lower parts 77A and 77B. As will be described below, the restricting walls 76Ab and 76Bb and the protruding pieces 75A and 75B have a function as movement restricting parts that restrict the movement of the high-voltage harness 65 in a direction perpendicular to the extending direction.

The pairs of supporting parts 72A and 72B, the connecting parts 73A and 73B, and the guiding parts 78A and 78B of the harness holders 70A and 70B are formed to extend in a direction substantially perpendicular to the fixing side parts 71A and 71B. The pairs of supporting parts 72A and 72B are formed to be thin, and can be displaced in the up-down direction with respect to the fixing side parts 71A and 71B, respectively. The pairs of supporting parts 72A and 72B, the connecting parts 73A and 73B, and the guiding parts 78A and 78B are displaced upward, in other words, toward the side of the electricity storage modules 40A and 40B, by the vibration damping material 83 bonded to the bottom cover 13. In this state, the connecting parts 73A and 73B biases the high-voltage harness 65 toward the electricity storage modules 40A and 40B such that the high-voltage harness 65 can be displaced in the left-right direction. The details will be described below.

The harness holder 70C has a fixing side part 71C and a fixing lower part 77C. A protruding piece 75C is provided to the tip point of the fixing lower part 77C. The fixing lower part 77C extends in a direction substantially perpendicular to the fixing side part 71C.

End parts of the tubular parts 111a of the holding case 111 of each of the electricity storage modules 40A to 40C in the axial direction (left-right direction) protrude a little from the outer surface of the left-end surface part 115a to form circular protrusions (first locking parts) 111b (refer to FIGS. 6A and 6B). In addition, a projection (second locking part) 111c (refer to FIGS. 6B and 11) is provided on the lower surface part 113 of the holding case 111 of each of the electricity storage modules 40A to 40C.

The harness holders 70A and 70B fit the openings 74A and 74B of the fixing side parts 71A and 71B with the protrusions 111b of the tubular parts 111a of the electricity storage modules 40A and 40B, respectively. In this state, the harness holders 70A and 70B engage the protruding pieces (second engaging parts) 75A and 75B of the fixing lower parts 77A and 77B with the projections 111c of the electricity storage modules 40A and 40B, respectively. By the engaging mechanism, the harness holders 70A and 70B are fixed to the electricity storage modules 40A and 40B, respectively, without using a fastening member. In this state, respective connecting parts 73A and 73B of the harness holders 70A and 70B are arranged between the tubular parts 111a of the holding cases 111 of the electricity storage modules 40A and 40B, and bias the high-voltage harness 65 toward the side of the lower surface parts 113 of the electricity storage modules 40A and 40B. The high-voltage harness 65 biased toward a side of the electricity storage modules 40A and 40B by the harness holders 70A and 70B can be displaced in the left-right direction, in other words, in the direction perpendicular to the extending direction of the high-voltage harness 65 between the restricting walls 76Ab and 76Bb and the protruding pieces 75A and 75B of the harness holders 70A and 70B. Accordingly, even when the length of the high-voltage harness 65 varies by the tolerance, the high-voltage harness 65 is surely biased toward the electricity storage modules 40A and 40B by the harness holders 70A and 70B. This will be described.

The high-voltage harness 65 is formed to have a large thickness for lowering the resistance, and has high rigidity. In order to make it easy to dispose the high-voltage harness 65 and to be joined to the external terminal, the high-voltage harness 65 is formed to have a length with a margin with respect to the length between connecting terminals to be connected. Therefore, the high-voltage harness 65 is disposed on the electricity storage modules 40A and 40B to curve in the left-right direction, in other words, in the direction perpendicular to the extending direction of the high-voltage harness 65. Here, the length of the high-voltage harness 65 varies by the tolerance. The variation in the length of the high-voltage harness 65 can be absorbed by displacing the high-voltage harness 65 disposed on the electricity storage modules 40A and 40B in the left-right direction to change the degree of curvature. In the embodiment of the present invention, the distance between the restricting walls 76Ab and 76Bb and the protruding pieces 75A and 75B of the harness holders 70A and 70B in the left-right direction is larger than the thickness of the high-voltage harness 65, and the high-voltage harness 65 can be displaced in the left-right direction. As just described, in the embodiment of the present invention, the harness holders 70A and 70B have a structure in which the high-voltage harness 65 can be surely biased toward the side of the electricity storage modules 40A and 40B even when there is a variation in the length of the high-voltage harness 65 in the extending direction.

Fixing of the harness holder 70C is the same as that when the harness holders 70A and 70B are fixed to the electricity storage modules 40A and 40B, and the harness holder 70C does not include a supporting part, a connecting part, a guiding part, a step part, and a restricting wall.

The temperature sensor lines 87 are inserted into the guiding parts 78A and 78B of the harness holders 70A and 70B (refer to FIG. 9). In addition, the voltage detection lines 86 are inserted into a guiding part 79 of the harness holders 70A to 70C (refer to FIG. 9).

[Assembling Method of Harness Vibrating Sound Prevention Structure]

One example of an assembling method of the harness vibrating sound prevention structure will be described.

It is assumed that the high-voltage harnesses 61 to 65 are electrically joined to predetermined connecting terminals.

The high-voltage harness 65 is disposed on the lower surface parts 113 of the holding cases 111 of the electricity storage modules 40A to 40C. The harness holders 70A to 70C are fixed to the electricity storage modules 40A to 40C, respectively, by the above-described procedure. When the harness holders 70A and 70B are fixed, the high-voltage harness 65 is displaced as necessary such that the high-voltage harness 65 is arranged between the restricting walls 76Ab and 76Bb and the protruding pieces 75A and 75B of the harness holders 70A and 70B. The vibration damping material 83 is bonded to the inner surface of the bottom cover 13 in advance, and the bottom cover 13 is fixed to the main case 11 with fastening members, such as bolts.

Accordingly, the high-voltage harnesses 62 and 65 are biased toward the side of the lower surface parts 113 of the holding cases 111 of the electricity storage modules 40A and 40B directly or through the harness holders 70A and 70B by the vibration damping material 83.

The background of the present invention will be supplemented.

In order to expand effective space in a vehicle, in recent years, installation space of electricity storage modules has been further reduced in size. As a result, space in which high-voltage harnesses are disposed is also reduced in size, and thus, generation of harsh vibrating sound from an electricity storage device is sometimes recognized.

When the present inventors conducted an investigation into the cause, it was confirmed that this is because the high-voltage harnesses vibrate to come into contact with an electricity storage case by a charge/discharge current when charging/discharging the electricity storage modules. As just described, the present invention solves a new problem, that is, a reduction in noise by the generation of the vibrating sound from the electricity storage device, which is due to the vibration of the high-voltage harnesses during charging/discharging.

The following advantageous effects are exhibited by the above-described embodiment of the electricity storage device 1 of the present invention.

The high-voltage harnesses 62 and 65 disposed in the space region 2C between the electricity storage modules 40A to 40C and the electricity storage case 2 are configured to be biased toward the side of the electricity storage modules 40A to 40C by the vibration damping material 83. Thus, the vibration of the high-voltage harnesses 62 and 65 generated when charging/discharging the electricity storage device 1 is alleviated, and the generation of the vibrating sound due to the contact with the electricity storage case 2 or the electricity storage modules 40A to 40C can be suppressed.

(2) The harness holders 70A and 70B which support the high-voltage harnesses 62 and 65 are formed such that the widths thereof (the length in the left-right direction) are larger than the thicknesses of the linear high-voltage harnesses 62 and 65. The vibration energy of the high-voltage harnesses 62 and 65 is linear along the length direction, but becomes planar with the presence of the harness holders 70A and 70B. When the vibration energy is changed from the linear shape to the planar shape, the vibration energy per unit area is reduced. The reduced vibration energy is transferred to the vibration damping material 83, and thus, the vibration absorption efficiency can be increased.

(3) The distance between the restricting walls 76Ab and 76Bb and the protruding pieces 75A and 75B of the harness holders 70A and 70B in the left-right direction is larger than the thickness of the high-voltage harness 65, and the high-voltage harness 65 can be displaced in the direction perpendicular to the extending direction thereof. Thus, the high-voltage harness 65 can be surely biased toward the side of the electricity storage modules 40A and 40B by the harness holders 70A and 70B even when there is a variation in the length of the high-voltage harness 65 in the extending direction.

(4) The openings 74A to 74C of the fixing side parts 71A to 71C and the protruding pieces 75A to 75C of the harness holders 70A to 70C are engaged with the protrusions 111b and the projections 111c of the electricity storage modules 40A to 40C, respectively, so that the harness holders 70A to 70C are fixed to the electricity storage modules 40A to 40C only by the engagement, without using a fastening member or the like. In the fixing structure by the engaging mechanism, the harness holders 70A to 70C are loosened by looseness due to the engagement, thus a fixing posture is changed in association with the disposing configuration of the high-voltage harness having high rigidity, and the degree of freedom of fixing of the high-voltage harness can be increased.

(5) The harness holders 70A and 70B have a structure in which the fixing side parts 71A and 71B and the connecting parts 73A and 73B are connected by the pairs of supporting parts 72A and 72B which are provided at intervals in the front-rear direction. The pairs of supporting parts 72A and 72B are formed at intervals, and thus, have low rigidity, and the followability of the displacement in the up-down direction is good. As described above, the harness holders 70A to 70C are fixed to the electricity storage modules 40A and 40B only by the engagement, and in addition, the harness holders 70A and 70B have good followability with respect to the vibration of the high-voltage harness 65. Accordingly, the alleviation efficiency of the vibration of the high-voltage harness 65 can be improved.

In the above-described embodiment, the vibrating sound suppression structure by the vibration damping material 83 is illustrated by the structure that takes measures against the high-voltage harnesses 62 and 65. However, among the high-voltage harnesses 62 and 65 disposed on the electricity storage modules 40A to 40C, the vibrating sound suppression structure may be applied to only the high-voltage harness 65 whose extending length is the longest, and thus, whose tolerance is the largest.

In the above-described embodiment, the structure in which the linear energy of the high-voltage harnesses 62 and 65 is changed to the planar energy by the harness holders 70A to 70C fixed to the electricity storage modules 40A to 40C is illustrated. However, in place of the harness holders 70A to 70C, a sheet-shaped energy diffusion member which is wider than the thicknesses of the high-voltage harnesses 62 and 65 may be interposed between the high-voltage harnesses 62 and 65 and the vibration damping material 83. The sheet-shaped energy diffusion member may be bonded to one of the high-voltage harnesses 62 and 65 and the vibration damping material 83.

In the above-described embodiment, the structure in which the high-voltage harness 65 can be displaced in the direction perpendicular to the extending direction of the high-voltage harness 65 between the restricting walls 76Ab and 76Bb and the protruding pieces 75A and 75B of the harness holders 70A and 70B so that the variation in the length of the high-voltage harness 65 is absorbed is illustrated. However, a clamping member may be provided in front of the electricity storage module 40A in the electricity storage module-housing area 2A such that the variation of the high-voltage harness 65 is absorbed by holding the high-voltage harness 65 with the clamping member. In the case of the foregoing structure, the distance between the restricting walls 76Ab and 76Bb and the protruding pieces 75A and 75B of the harness holders 70A and 70B may be made to be substantially the same as the thickness of the high-voltage harness 65 such that the high-voltage harness 65 may not be displaced in the direction perpendicular to the extending direction. In addition, a clamper may be used in place of the harness holders 70A and 70B such that the high-voltage harness 65 is fixed with the clamper.

In the above-described embodiment, the structure in which the harness holders 70A and 70B are directly in contact with the high-voltage harness 65 is illustrated, but another vibration damping material may be interposed between the harness holders 70A and 70B and the high-voltage harness 65.

In the above-described embodiment, the structure in which the openings 74A to 74C of the fixing side parts 71A to 71C of the harness holders 70A to 70C are fitted with the disk-shaped protrusions 111b which are end parts of the tubular parts 111a of the holding cases 111 of the electricity storage modules 40A to 40C is illustrated. However, other disk-shaped protrusions may be provided on the holding cases 111 such that the openings 74A to 74C of the fixing side parts 71A to 71C of the harness holders 70A to 70C are fitted with the protrusions.

The harness holders 70A to 70C may be fixed to the electricity storage modules 40A to 40C using a fastening member.

Various modes can be applied to the structure of the electricity storage case 2.

The present invention is not limited to the electricity storage device including a lithium-ion secondary battery, and can also be applied to an electricity storage device including a secondary battery using an aqueous electrolyte, such as a nickel-hydride battery, a nickel-cadmium battery, or a lead storage battery. In addition, the present invention can also be applied to an electricity storage device including an electricity storage element, such as a lithium-ion capacitor or an electrolytic double-layer capacitor.

In addition, the electricity storage device of the present invention can be applied by making various modifications within the scope of the gist of the invention, and the point is that the electricity storage device includes a plurality of electricity storage modules, each including an electricity storage module case and a plurality of electricity storage cells housed in the electricity storage module case, and each having external terminals of positive and negative electrodes; an electricity storage case in which the plurality of electricity storage modules are linearly arranged and housed; a plurality of wire harnesses connected to the external terminals of the positive and negative electrodes of the electricity storage modules; and a vibration damping material provided in a space region between one surface of the electricity storage case and, among the plurality of wire harnesses, at least a wire harness having the longest length extending in an arrangement direction of the electricity storage modules, in which at least a part of the wire harness having the longest length extending in the arrangement direction of the electricity storage modules is biased toward the side of the electricity storage module case by the one surface of the electricity storage case, through the vibration damping material.

REFERENCE SIGNS LIST

1 Electricity storage device
2 Electricity storage case
2A Electricity storage module-housing area
2B Control unit-housing area
2C Space region
3 Junction box
3a Plus terminal
3c Minus terminal
4 LBC
11 Main case
11a Right wall
11b Exhaust port
12 Side cover
12a Through hole
13 Bottom cover
14 Top cover
15 LBC cover
40, 40A to 40C Electricity storage module
41A to 41C Positive electrode terminal (external terminal)
42A to 42C Negative electrode terminal (external terminal)
43 Module fixing through hole (insertion part)
53 SD switch
61 to 65 High-voltage harness (wire harness)
70A to 70C Harness holder
71A to 71C Fixing side part
72A, 72B Supporting part
73A, 73B Connecting part (pressing part)
74A to 74C Opening (first engaging part)
75A to 75C Protruding piece (second engaging part)
76Aa, 76Ba Step part (movement restricting part)
76Ab, 76Bb Restricting wall (movement restricting part)
77A to 77C Fixing lower part
78A, 78B Guiding part
79 Guiding part
80 Partitioning member
81 Bolt
82 Back nut
83 Vibration damping material 86 Voltage detection line
87 Temperature sensor line
101 Secondary battery cell (electricity storage cell)
111 Holding case (electricity storage module case)
111a Tubular part (tubular protrusion)
111b Protrusion (first locking part, disk-shaped protrusion)
111c Projection (second locking part)
112 Upper surface part
113 Lower surface part
114 Vertical wall part
115a Left-end surface part
115b Right-end surface part
116 Refrigerant inlet port
118 Refrigerant outlet port
201, 202 Voltage detection substrate
201a, 202a Connector connection part

The invention claimed is:

1. An electricity storage device comprising:
a plurality of electricity storage modules, each including an electricity storage module case, a plurality of electricity storage cells housed in the electricity storage module case, and external terminals of positive and negative electrodes;
an electricity storage case in which the plurality of electricity storage modules are arranged and housed;
a plurality of wire harnesses connected to the external terminals of the positive and negative electrodes of the electricity storage modules; and
a vibration damping material provided in a space region between one surface of the electricity storage case and, among the plurality of wire harnesses, at least a wire harness including the longest length extending in an arrangement direction of the electricity storage modules, wherein
the wire harness including the longest length extending in the arrangement direction of the electricity storage modules is biased toward a side of the electricity storage module case by the one surface of the electricity storage case, through the vibration damping material.

2. The electricity storage device according to claim 1, wherein
a vibration energy diffusion member that diffuses vibration energy of the wire harness and is wider than a thickness of the wire harness is provided in at least a part between the vibration damping material and the wire harness.

3. The electricity storage device according to claim 2, wherein
the vibration energy diffusion member is a harness holder including a pressing part that biases the wire harness toward the side of the electricity storage module case.

4. The electricity storage device according to claim 3, wherein
a movement restricting part that restricts movement of the wire harness in a direction perpendicular to an extending direction of the wire harness is provided on the harness holder.

5. The electricity storage device according to claim 4, wherein
the movement restricting part includes a pair of protrusions provided at an interval larger than the thickness of the wire harness, and
the wire harness can be displaced in the direction perpendicular to the extending direction of the wire harness.

6. The electricity storage device according to claim 5, wherein
the plurality of wire harnesses are arranged between the one surface of the electricity storage case and a plurality of the electricity storage module cases, and
the vibration damping material biases at least a part of each of the plurality of wire harnesses toward the side of at least one of the electricity storage module cases.

7. The electricity storage device according to claim 4, wherein
the plurality of wire harnesses are arranged between the one surface of the electricity storage case and a plurality of the electricity storage module cases, and
the vibration damping material biases at least a part of each of the plurality of wire harnesses toward the side of at least one of the electricity storage module cases.

8. The electricity storage device according to claim 3, wherein
tubular protrusions including insertion parts which extend in a direction substantially perpendicular to the extending direction of the wire harness and into which fastening members for fixing the electricity storage modules to the electricity storage case are to be inserted are provided on one surface of the electricity storage module case which is opposed to the one surface of the electricity storage case.

9. The electricity storage device according to claim 8, wherein
the harness holder includes the pressing part that biases the wire harness toward the side of the one surface of the electricity storage module case, and
the pressing part is arranged between the tubular protrusions of at least one of the electricity storage modules.

10. The electricity storage device according to claim 9, wherein
the plurality of wire harnesses are arranged between the one surface of the electricity storage case and a plurality of the electricity storage module cases, and
the vibration damping material biases at least a part of each of the plurality of wire harnesses toward the side of at least one of the electricity storage module cases.

11. The electricity storage device according to claim 8, wherein
the plurality of wire harnesses are arranged between the one surface of the electricity storage case and a plurality of the electricity storage module cases, and
the vibration damping material biases at least a part of each of the plurality of wire harnesses toward the side of at least one of the electricity storage module cases.

12. The electricity storage device according to claim 3, wherein
the plurality of wire harnesses are arranged between the one surface of the electricity storage case and a plurality of the electricity storage module cases, and
the vibration damping material biases at least a part of each of the plurality of wire harnesses toward the side of at least one of the electricity storage module cases.

13. The electricity storage device according to claim 2, wherein
the plurality of wire harnesses are arranged between the one surface of the electricity storage case and a plurality of the electricity storage module cases, and
the vibration damping material biases at least a part of each of the plurality of wire harnesses toward the side of at least one of the electricity storage module cases.

14. The electricity storage device according to claim 1, wherein
the plurality of wire harnesses are arranged between the one surface of the electricity storage case and a plurality of the electricity storage module cases, and
the vibration damping material biases at least a part of each of the plurality of wire harnesses toward the side of at least one of the electricity storage module cases.

* * * * *